July 23, 1968 G. K. MEDICUS 3,394,320
GAS LASERS WITH IMPROVED CAPILLARY TUBE
Filed April 20, 1965
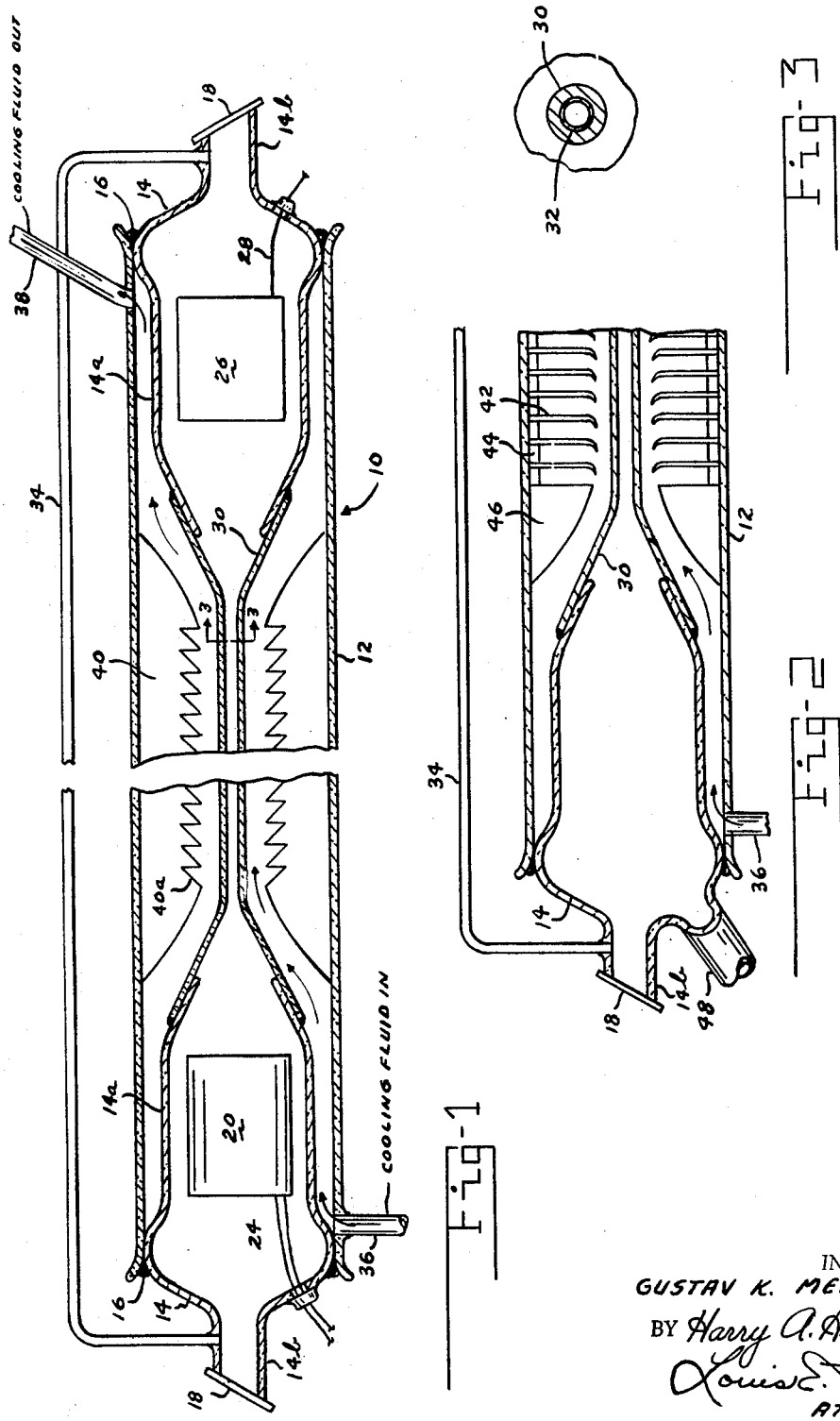
INVENTOR.
GUSTAV K. MEDICUS
BY Harry A. Herbert Jr.
Louis E. Way
ATTORNEYS

3,394,320
GAS LASERS WITH IMPROVED CAPILLARY TUBE
Gustav K. Medicus, 7521 W. Hyland Ave.,
Dayton, Ohio 45424
Filed Apr. 20, 1965, Ser. No. 449,653
5 Claims. (Cl. 331—94.5)

The invention described herein may be manufactured and used by or for the United States Government for governmental purposes without the payment to me of any royalty thereon.

This invention relates to laser devices, and more specifically to gas laser devices.

The output of conventional gas lasers based on transitions among ionic levels in continuous wave operation is limited by the heat transfer through the wall of the capillaries in which the discharge is generated. It has been common practice in the past to make the capillaries of quartz, glass, or ceramics; all of which have poor heat conductivity. The maximum current which may be passed through any capillary tube is determined by the highest permissible temperature of the inner wall of the capillary tube.

Research has established that the maximum allowable temperature of the inner wall of the capillary tube is near the melting temperature of the material from which the tube is constructed.

With the inside of the capillary tube at this very high temperature, and with the outside of the tube at ambient temperature, a temperature difference exists between the inner and the outer walls, causing a heat flow from the inner to the outer wall where the heat is dissipated. In this type of capillary tube, the greatest heat dissipation is achieved when the tube wall is made as thin as possible for a given inside diameter.

The laser light output increases with the square (or an even higher power) of the current flowing through the capillary tube. For any given capillary diameter, the current flow is limited by the maximum temperature which can be tolerated by the inside wall surface of the particular material forming the capillary tube. Furthermore, for any given wattage input into the discharge of the capillary, the heat flow through the wall of the capillary tube determines the temperature at the inside wall. The ideal capillary tube is one which is too thin to be self-supporting, and therefore, all capillary tubes must have wall thicknesses greater than the ideal wall in order to have structural rigidity. As will be disclosed, the capillary tube in accordance with this invention provides a thin wall structure having the necessary structural rigidity, while permitting increased heat flow through the wall of the capillary. This new capillary tube is made of materials and in a manner not previously used on laser devices.

The primary object of this invention is to provide a gas laser having an increased laser light output.

A further object of this invention is to provide a gas laser with a capillary tube having better heat conductivity than conventional capillary tubes.

Yet another object of this invention is to provide a gas laser being, for a given light output, a smaller size than was heretofore possible.

Additional objects, advantages and features of the invention reside in the construction, arrangement and combination of parts involved in the embodiments of the invention as will appear from the following description and accompanying drawing, wherein:

FIG. 1 is a cross section of a first embodiment of the invention using a conventional hollow oxide cathode and a serrated spool turbulator;

FIG. 2 is a cross section of a second embodiment of the invention, similar to the first embodiment, except for the use of a mercury spool cathode and a stacked-disk turbulator; and FIG. 3 is a cross section of the capillary tube taken on line 3—3 of FIG. 1 and showing the dielectric coating within the capillary tube.

Referring to FIG. 1 of the drawing, gas laser 10 has an elongated cylindrical body member 12 which houses or otherwise supports the other elements of the laser. Both ends of cylindrical body 12 supports end chambers 14 which are retained within the ends of the body by sealant 16. The sealant may be any convenient material, such as, General Electric Company RTV–102, Silicone Rubber Adhesive; the only specific requirement being to form a leak-proof junction between the body and the end chambers which will not deteriorate.

Each end chamber 14 is substantially an elongated circular structure with the major portion extending inward into the ends of the body. The largest diameter on each end chamber is joined to the body, and this diameter tapers inward into the main central portion 14a which has an exterior diameter somewhat less than the inside diameter of the body in order to form an annulus between the inside wall of the body and the exterior diameter of the main central portion 14a. The interior end of each central portion 14a tapers inward to form a conical structure with an opening at the apex. The external portion of the largest diameter on each end chamber also tapers into the reduced diameter capillary ends 14b which form the outer ends of each end chamber. The terminal end of capillary end 14b, as shown, is bevel cut to the proper Brewster angle and is sealed with a window 18 which may be made of quartz and cemented in position.

Each circular element of the end chamber is coaxial, and both end chambers are mounted to be coaxial with each other on the longitudinal axis of the body member.

Referring to FIG. 1, the first or left-hand end chamber 14 houses a conventional hollow oxide cathode 20. The cathode may be coaxially supported within the main central portion 14a by any convenient means of support, such as the electrical leads 24 which are fused through the wall of the end chamber and which also provide the conduit means through which the cathode is energized by an external power source, not shown. The cathode may be installed in the end chamber, during construction, by placing the cathode into position before the inner end is tapered down by the glass blower forming the end chamber.

The second or right-hand end chamber 14 houses an anode 26. The anode may be a hollow, cylindrical metallic tube having substantially the same external diameter as cathode 20, and may be coaxially supported by suitable electrical leads 28. The anode may be positioned in the same manner as the cathode.

The two end chambers are joined within body 12 by means of capillary tube 30. The capillary tube is outwardly flared at each end into a funnel-like conical opening which will surround and engage the conical inner end on each end chamber as shown. The capillary tube, which is to be metallic within the scope of this invention, may be joined into position with epoxy cement to provide leak-proof connections.

The capillary tube 30, which is to be metallic, is preferably made of aluminum, beryllium, tantalum, titanium, or niobium, and is to be provided with an internal dielectric film or coating 32, as shown on FIG. 3. While not limited to such method, the dielectric film is best formed by an anodization process. The insulating film or dielectric coating within the capillary tube must be of very high quality in order to withstand severe operating conditions to be encountered. The insulating film is subjected to comparatively high electrical field strength even when the laser is operating at relatively low voltage; and during ignition, the electrical stress will be still greater. In addition to electrical stress, the insulating film will also be subjected to severe thermal stress. Therefore, the insulating film must be of excellent quality and must make excellent thermal contact with the metallic portion of the capillary tube. For the above reasons, anodization will provide the best known method of forming the insulating film. The above-named five metals are preferred because they are easiest to anodize, and because they have favorable thermal characteristics. Ideally, it would be most advantageous if the capillary tube could be formed of only the insulating film. Since this can not be done, the metallic portion of the tube may be regarded as a supporting means for the insulating film.

The anodization process for tubes made of the above-named five metals may be as follows: (1) a thin wire of suitable material, such as stainless steel is axially extended through the tube to form the cathode while the tube forms the anode, and (2) a suitable electrolyte is pumped through the tube. In addition to the flowing electrolyte, which acts as a cooling medium, the outside of the tube may be further cooled to obtain adequate anodization.

Both embodiments of the invention are equipped with a conventional hollow by-pass tube 34 joining the two ends of the laser for the return flow of the circulating gas within the laser.

Both embodiments of the invention are provided with a circulating fluid cooling system. The cylindrical body 12 is provided with a fluid inlet 36 and a fluid outlet 38 which are joined to an external circulating pump in the well known manner, and is therefore not shown. The fluid flow through the laser is indicated by suitable arrows. A turbulator means is provided to turbulate the cooling fluid flowing through the laser in order to increase the heat flow from the capillary tube 30. Either of two turbulator forms may be used, one form being shown on FIG. 1 and the second form shown on FIG. 2. The first form, as shown on FIG. 1, comprises two split halves 40, which, when placed together, have an outside diameter which will permit the two halves to slidably engage the inside of the body. The central bore of the split halves is sufficiently larger than the outside diameter of the central portion of the capillary tube to provide an annulus for the flow of cooling fluid. The central bore contains a plurality of circular serrations 40a which agitate or turbulate the cooling fluid flowing adjacent to the central portion of the capillary tube. The central bore in the split halves of the turbulator is flared outwardly to the outside diameter thereon, as shown, to provide adequate flow passages adjacent to the flared ends of the capillary tube. The turbulator may be built of suitable light-weight metal, such as aluminum, or, it may be made of suitable plastic. The turbulator is not regarded as a heat transfer element; its purpose being to turbulate the cooling fluid which is the heat dissipating medium employed. The turbulator is split into halves in order that it may be installed in position around the capillary tube.

The second form of the turbulator is shown on FIG. 2. This form, which is also split in order that it may be installed around the capillary tube, has a plurality of split centrally pierced disks 42 which are nested between split washers 44. The central pierced portion of each disk may be flared upstream against the flowing cooling fluid in order to increase turbulence. The turbulator, in which the principal central portion comprises a plurality of interdigitated split disks and split washers, terminates at each end in a guide ring, each guide ring being split into two guide ring halves 46. Each guide ring is centrally flared as shown to provide adequate flow passages adjacent to the flared ends of the capillary tube.

The second embodiment of the invention, as shown on FIG. 2, may be made identical with the first embodiment, with the single exception of substituting a conventional mercury pool cathode (not shown) for the conventional hollow oxide cathode 20 shown on FIG. 1. The mercury pool cathode is joined to the hollow entrance tube 48 on FIG. 2. Either form of turbulator may be used on either laser embodiment.

The body 12, both end chambers 14, by-pass tube 34, and tubes 36 and 38, may all be made of Pyrex glass. After the end chambers are completely formed, with their contained elements, they are coaxially joined with epoxy cement to the capillary tube 30. The sub-assembly so formed, together with the turbulator elements are then fed into the body and sealed into position.

The wiring circuits and power supply are all standard circuits, well known to the art and for that reason not shown. The circuits comprise the conventional ignition and holding circuits. The laser may be charged with argon.

Anodes and cathodes, other than those illustrated, may be used within the scope of this invention. It is necessary, however, that they be mounted in such a manner as will prevent mechanical obstruction along the longitudinal axis through the laser.

It is to be understood that the embodiments of the present invention as shown and described are to be regarded as illustrative only and that the invention is susceptible to variations, modifications and changes within the scope of the appended claims.

I claim:

1. A gas laser comprising: a hollow body member having coaxial openings at opposing ends; two hollow end chambers one each of which is joined within the openings at opposing ends of said body member, said hollow end chambers each having an opening axially extending into said body member and a closed capillary end extending outwardly from the junction between said end chamber and said body member, the capillary end on one of said hollow end chambers being coaxial with the capillary end on the other of said end chambers when said end chambers are joined to said body member; a hollow by-pass tube joining the interiors of said end chambers at the regions extending outwardly from the junctions between said end chambers and said body member; a capillary tube with an elongated central tube portion having opposing ends joined to the openings of said end chambers with the central tube portion coaxial with the closed capillary ends on said end chambers, said capillary tube being metallic and coated on the inside with a dielectric material; a cathode means joined to and in communication with the inside of one of said end chambers; an anode means joined to and in communication with the inside of the other of said end chambers; said cathode means and said anode means being mounted to prevent mechanical obstruction along the longitudinal axis through said laser and having connecting means for joining said cathode and said anode to a power supply; said body member further having passage means in communication with the interior of said body member and adapted for joining to an external source of cooling fluid for flowing cooling fluid through the annulus formed between the interior of said body member and the exterior of said capillary tube.

2. A gas laser comprising: a hollow elongated body member having coaxial openings at opposing ends; two hollow end chambers one each of which is joined within the openings at opposing ends of said body member, said hollow end chambers each having an opening extending into said body member and a closed capillary end extending outwardly from the junction between said end chamber and said body member, the capillary end on one of said hollow end chambers being coaxial with the capillary end on the other of said end chambers when said end chambers are joined to said body member; a hollow by-pass tube joining the interiors of said end chambers at the regions extending outwardly from the junctions between said end chambers and said body member; a capillary tube with an elongated central tube portion having opposing ends joined to the openings of said end chambers with the central tube portion coaxial with the closed capillary ends on said end chambers, said capillary tube material being selected from the group consisting of aluminum, beryllium, niobium, tantalum and titanium and coated on the inside with a dielectric material; a cathode means joined to and in communication with the inside of one of said end chambers; an anode means joined to and in communication with the inside of the other of said end chamber; an anode means joined to and in communication with the inside of the other of said end chambers; said cathode means and said anode means being mounted to prevent mechanical obstruction along the longitudinal axis through said laser and having connecting means for joining said cathode and said anode to a power supply; said body member further having passage means in communictaion with the interior of said body member and adapted for joining to an external source of cooling fluid for flowing cooling fluid through the annulus formed between the interior of said body member and the exterior of said capillary tube.

3. A gas laser in accordance with claim 2 in which the dielectric material on the inside of said capillary tube is an anodized coating.

4. A gas laser comprising: a hollow elongated body member having coaxial openings at opposing ends; two hollow end chambers one each of which is joined within the openings at opposite ends of said body member, said hollow end chambers each having an opening extending into said body member and a closed capillary end extending outwardly from the junction between said end chamber and said body member, the capillary end on one of said hollow end chambers being coaxial with the capillary end on the other of said end chambers when said end chambers are joined to said body member; a hollow bypass tube joining the interiors of said end chambers at the regions extending outwardly from the junctions between said end chambers and said body member; a capillary tube with an elongated central tube portion having opposing ends joined to the openings of said end chambers with the central tube portion coaxial with the closed capillary ends on said end chambers, said capillary tube material being selected from the group consisting of aluminum, beryllium, niobium, tantalum and titanium and coated on the inside with a dielectric material; a cathode means joined to and in communication with the inside of one of said end chambers; an anode means joined to and in communication with the inside of the other of said end chambers; said cathode means and said anode means being mounted to prevent mechanical obstruction along the longitudinal axis through said laser and having connecting means for joining said cathode and said anode to a power supply; a tubulator means supported within said body member and longitudinally located to be adjacent to said capillary tube, said turbulator means being configured to provide an annular passage between said turbulator means and said capillary tube; said body member further having passage means in communication with the interior of said body member and adapted for joining to an external source of cooling fluid for flowing cooling fluid through the annular passage between said turbulator means and said capillary tube.

5. A gas laser in accordance with claim 4 in which the dielectric material on the inside of said capillary tube is an anodized coating.

No references cited.

JEWELL H. PEDERSEN, *Primary Examiner.*

W. L. SIKES, *Assistant Examiner.*